(No Model.)

D. T. ELLIS.
HOSE STRAP.

No. 461,407. Patented Oct. 13, 1891.

WITNESSES.
J. M. Dolan.
J. T. Ball.

INVENTOR.
David T. Ellis
by his atty
Clarke & Raymond

UNITED STATES PATENT OFFICE.

DAVID T. ELLIS, OF BRIDGEPORT, CONNECTICUT, ASSIGNOR TO CHARLES S. KNOWLES, OF BOSTON, MASSACHUSETTS.

HOSE-STRAP.

SPECIFICATION forming part of Letters Patent No. 461,407, dated October 13, 1891.

Application filed July 5, 1889. Serial No. 316,608. (No model.)

*To all whom it may concern:*

Be it known that I, DAVID T. ELLIS, of Bridgeport, in the county of Fairfield and State of Connecticut, a citizen of the United States, have invented a new and useful Improvement in Hose-Straps, of which the following is a full, clear, and exact description, reference being had to the accompanying drawings, forming a part of this specification, in explaining its nature.

The invention relates to a hose-strap made, preferably, of wire, and having parallel or substantially parallel sections united at one end by a cross-bar and having each of the free ends turned into the form of a hook.

This strap is cheap to make and has means, as will hereinafter appear, whereby it is easily stretched or applied to the hose.

Figure 1:
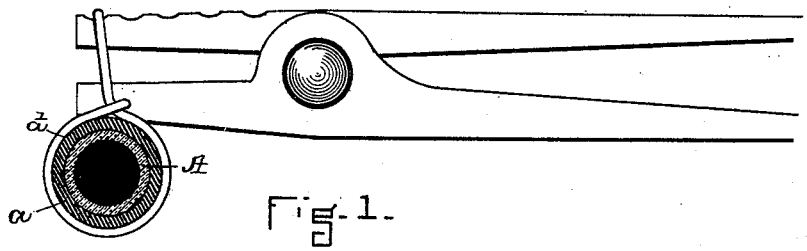
Figure 6:
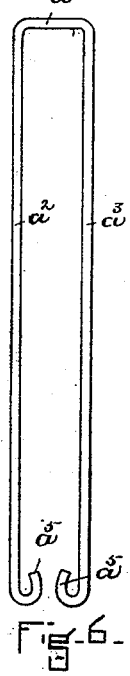
Figure 2:
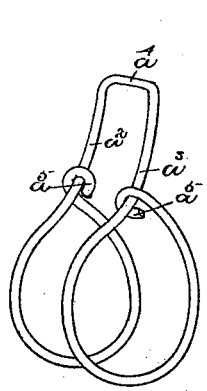
Figure 5:
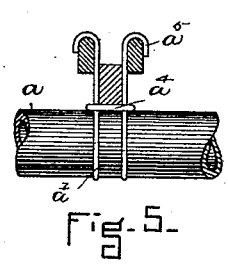
Figure 3:
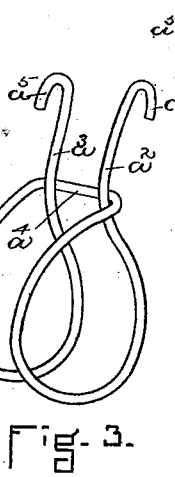
Figure 7:
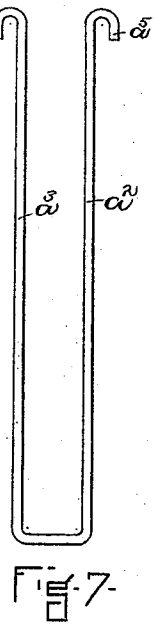
Figure 4:
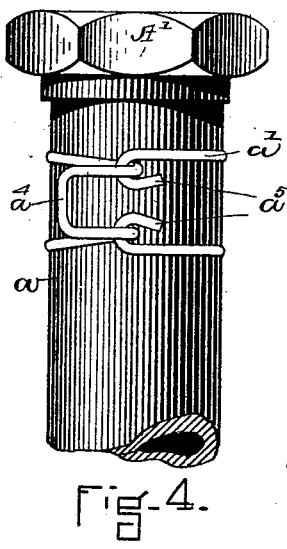

Referring to the drawings, Figure 1 is a view in section of a piece of hose, a coupling, and an elevation of the strap and tool for applying it. Fig. 2 is a perspective view of the strap. Fig. 3 illustrates a slightly-different form of applying the strap. Fig. 4 represents the hose and strap applied to it and the coupling. Fig. 5 illustrates the manner of applying the strap when used as represented in Fig. 3. Figs. 6 and 7 show the first operation in constructing the strap.

In Fig. 1 I have represented the strap as applied to hose attached to one section of a coupling and in Fig. 4 to hose connected by a mending-thimble.

A represents the coupling, and A' the mending-thimble.

$a$ is the hose.

$a'$ is the strap, and it is shaped before its application to the hose as represented in Fig. 2. It is preferably made of wire, and it has the parallel sections or parts $a^2 a^3$, which are connected by a cross-bar $a^4$, and the opposite ends of which are disconnected, and each of which is bent to form a hook $a^5$. These hooks may be bent outwardly, so as to be opposed to each other, as represented in Fig. 7, or inwardly or toward each other, as represented in Fig. 6, and the strap may be applied to the hose by an implement one section or edge of which rests against the bar, as represented in Fig. 1, and the other section or edge of which is embraced by the hooks, as represented in Fig. 1, or as represented in Fig 5, where the jaw rests upon the hooks, and a jaw acts against the bar to strain the band in relation to the hook or hooks resting upon the hose. In the last-named case the free ends of the wires pass within the wires at the bar end and in the first-named case the free ends of the wires pass without the wires at the bar end, and the hooked ends serve to keep the wires separated from each other as the strap is being drawn taut on the hose.

A strap of this character is easily formed and applied and can be made of any annealed wire or metal.

Having thus fully described my invention, I claim and desire to secure by Letters Patent of the United States—

As an improved article of manufacture, a hose-strap made of a single piece of wire bent or shaped before its application to a hose to have a cross-bar $a^4$, the parallel side bars $a^2 a^3$, and the curved ends $a^5$, bent upon the same plane and upon a line with the cross-bar to form attaching-hooks prior to the application of the strap to the hose, and by means of which, in straining the strap to the hose, draft may be exerted simultaneously in the same direction upon each free end, as and for the purposes described.

DAVID T. ELLIS.

Witnesses:
 LEDLIE GLONINGER,
 MILTON I. BAIRD.